(12) United States Patent
Atyunin et al.

(10) Patent No.: US 6,788,102 B2
(45) Date of Patent: Sep. 7, 2004

(54) TRANSMITTER WITH ACTIVE DIFFERENTIAL TERMINATION

(75) Inventors: Vasily Grigorievich Atyunin, St. Petersburg (RU); Alexander Roger Deas, Edinburgh (GB)

(73) Assignee: Acuid Corporation (Guernsey) Limited, Guernsey (VG)

( * ) Notice: Subject to any disclaimer, the term of this patent is extended or adjusted under 35 U.S.C. 154(b) by 0 days.

(21) Appl. No.: 10/425,638

(22) Filed: Apr. 30, 2003

(65) Prior Publication Data

US 2003/0234677 A1 Dec. 25, 2003

Related U.S. Application Data

(63) Continuation-in-part of application No. PCT/RU01/00484, filed on Oct. 31, 2001.
(60) Provisional application No. 60/244,177, filed on Oct. 31, 2000.

(51) Int. Cl.[7] .............................................. H03K 19/003
(52) U.S. Cl. .............................. 326/30; 326/26; 326/87
(58) Field of Search ............................. 326/21, 22, 26, 326/30, 87

(56) References Cited

U.S. PATENT DOCUMENTS

| | | | |
|---|---|---|---|
| 5,528,268 A | 6/1996 | Kleveland | 326/30 |
| 5,578,939 A | 11/1996 | Beers | 326/30 |
| 5,604,450 A | 2/1997 | Borkar | 326/82 |
| 5,686,872 A | 11/1997 | Bar-Niv | 333/22 |
| 5,781,028 A | 7/1998 | Decuir | 326/30 |
| 6,246,255 B1 * | 6/2001 | Takizawa | 326/30 |
| 6,297,664 B1 * | 10/2001 | Galli | 326/30 |

* cited by examiner

Primary Examiner—Anh Q. Tran

(57) ABSTRACT

The present invention relates to a transmitter for high speed communication systems, comprising a plurality, preferably two, drivers each having series terminating resistor, wherein the series terminating resistors are joined at the transmission line. The drivers are controlled in two modes. In the first mode, a control unit supplies drivers with a signal which is a function of input data, to provide the transmitter drives a communication line with an output impedance equal to the parallel effect of all the terminating resistors. In the second mode, the control unit generates a signal to make the drivers with respective series terminating resistors acting as a parallel termination circuit. No actual data is transmitted in this mode. In a preferable embodiment, to achieve this, one driver or a group of drivers drives one logic level signal, while the other drivers drives the inverse to this signal.

17 Claims, 5 Drawing Sheets

TRANSMITTER WITH ACTIVE DIFFERENTIAL TERMINATION

RELATED APPLICATION DATA

This application is a continuation-in-part application of PCT/RU01/00484 filed on Oct. 31, 2001, claiming priority from U.S. provisional application 60/244,177 filed on Oct. 31, 2000, all of which are incorporated herein by reference.

FIELD OF THE INVENTION

The present invention relates generally to transmitters and transceivers for high speed communication systems and, more particularly, to transmitters for transmitting signals with a controlled impedance load.

Also, the present invention relates to termination circuits and methods therefor. More particularly, the present invention relates to termination circuits that advantageously provides fast and efficient signal transmission via transmission lines in electronic systems.

BACKGROUND OF THE INVENTION

In the design and implementation of electronic systems particularly those employing integrated circuits, undesired transmission line effects are of a particular concern. As signals travels down transmission lines, e.g., traces on a printed circuit board, reflections may occur on the lines. The reflections are due to, for example, mismatched impedances between the driver circuit and the line, which may cause the signal to reflect back and forth, giving rise to ringing. These reflections and other undesired transmission lines effects are often exacerbated as the operating speed of the signal increases. If left uncorrected, the reflections may cause the signal's voltage to swing outside of the defined "0" or "1" voltage levels, thereby causing the receiving device to incorrectly interpret the signal received and generate erroneous results.

To address the impedance mismatch between the driver (or receiver) circuit and the transmission line, a variety of techniques have been known in the prior art.

Typically, high speed communication systems transmit a signal down a line with a terminating voltage and terminating resistance, normally located near the receiver. The effect of the transmitter is to send a fully saturated digital signal into the transmission line at the same impedance as the line itself such that any reflections from impedance anomalies in the line do not cause further reflections from the transmitter. The receiver has a terminating load at the same impedance as the transmission line. The terminating resistances are arranged in very high speed systems to create a terminating voltage that is typically the median of the voltage value of the 1 and 0 of the digital signal.

As shown in FIG. 1, to provide the same preset voltage potential to the load, the conventional transceiver may comprise a resistor 3 incorporated in the bus line after the driver 1 and a terminating resistor 4 incorporated into the receiving circuit.

While this approach is effective for some systems, there are numerous disadvantages. For example, the use of an impedance matching resistor attenuates the signal, which lowers noise immunity while dramatically increasing power dissipation. To illustrate, the presence of resistor 4 forms essentially a resistor divider circuit between the characteristic impedance of the transmission line and resistor 4, thereby lowering the signal's voltage level at the receiving circuit.

Further, the presence of resistor 4 increases the power dissipation, which increases the load on the driver circuit and causes additional heat to be generated as well as more power from the system's supply.

The presence of resistor 3 creates a situation in which the input to any other device which might be connected to the transmission line sits at half amplitude, an undesirable condition while the line is settling. Still further, it is often difficult to provide impedance matching for transmission lines whose characteristic impedance may change with the system's configuration.

Thus, for high speed communication systems, it is complex to provide termination voltages and resistors to transmitters, as a receiver requires the signal with a controlled impedance load linked to a terminating voltage, but the transmitter requires to drive with a series termination into the same line. This causes the increase in swing and power losses and the reduction of the communication speed.

Moreover, contemporary high speed communication systems require quick direct triggering. However, the time required to switch the driver circuit of FIG. 1 into tri-state will be bigger than the time of switching from one logical state to another.

In U.S. Pat. No. 5,781,028, a system and a method are described for a switched termination of a universal serial data bus between first and second devices having transmitting and receiving modes. When the first device is in transmitting mode, a second termination coupled within a receiver circuit at the second end of the bus is activated to terminate the second end; when the first device is in receiving mode, a first termination coupled at this end of the bus is activated to terminate the first end. This arrangement provides for activating the termination at the receiving end only.

However, similar to the prior art already described above, switches used for connecting and disconnecting the resistors will introduce additional errors in the system, as the time required to switch the resistors will be bigger than the time of switching from one logical state to another. This prevents from achieving high speed operation in various applications where timings are critical. In view of the foregoing, there are desired transmitters with improved termination circuits and methods therefor that advantageously provide fast and efficient transmission of signals via transmission lines in electronic systems, particularly signals having low operating voltage ranges, whilst at the same time simplifying the implementation of transceivers in very high speed systems.

SUMMARY OF THE INVENTION

The present invention provides a transmitter which avoids or at least alleviates the above mentioned disadvantages of the prior art.

According to one aspect of the present invention, a transmitter comprises a plurality, preferably two, drivers each having series terminating resistor. The transmitter further comprises a control unit provided by a data signal and a control signal.

The control unit operates in two modes. In the first mode, the control unit supplies drivers with a signal which is a function of input data, to provide the transmitter drives a communication line with an output impedance equal to the parallel effect of all the terminating resistors.

In the second mode, the control unit generates a signal to make the drivers with respective series terminating resistors acting as a parallel termination circuit. No actual data is transmitted in this mode. In a preferable embodiment, to achieve this, one driver or a group of drivers drives one logic level signal, while the other drivers drives the inverse to this signal.

This means that if all drivers drive a data signal, which, in general, may not be the same for all drivers, then the signal is transmitted with an impedance equal to the parallel effect of all the terminating resistors. For example, if there are two drivers and each resistor is 100 Ohms, then driving the two in parallel will create a 50 Ohm drive impedance into the transmission line.

If the drivers drive complementary signals, that is, for example, one driver is high and the other is low, then a potential divider is formed which has an impedance of 50 Ohms and acts as a terminating resistance and terminating voltage to the receiver.

In another aspect, a method of high speed data transmission is provided, the method comprising the steps of:
(a) providing a plurality of drivers each having series terminating resistor, wherein the resistors are connected at a common point;
(b) providing a data signal;
(c) providing a control signal defining two modes of operation:
(d) in a first mode, a control unit supplies drivers with a signal which is a function of input data, to provide the plurality of drivers drives a communication line with an output impedance equal to the parallel effect of all the terminating resistors;
(e) in a second mode, the drivers are provided with a signal that makes the drivers with respective series terminating resistors acting as a parallel termination circuit, while no actual data is transmitted in this mode.

Preferably, the series terminating resistors are joined at the transmission line.

In case of two drivers, in the first mode they both drive the same signal. In the second mode, the drivers drive different, e.g. complementary, signals, i.e. one driver drives one logic level signal, while the other driver drives the inverse to this signal, thereby, a terminating voltage is formed as a half sum of high and low signal levels (for two equal series resistors).

The combination of the above features enables true synchronous operation of bi-directional communication channels, such as in chip-to-chip communications.

DETAILED DESCRIPTION OF THE PREFERRED EMBODIMENT

The present invention relates to a transmitter for high speed communication systems, a transceiver using such a transmitter and a method of high speed communication. The following description is presented to enable one of ordinary skill in the art to make and use the invention as provided in the context of a particular application and its requirements. Various modifications to the preferred embodiment will be apparent to those skilled in the art, and the general principles defined herein may be applied to other embodiments. Therefore, the present invention is not intended to be limited to the particular embodiment shown and described, but is to be accorded the widest scope consistent with the principles and novel features herein disclosed.

Figure 1:
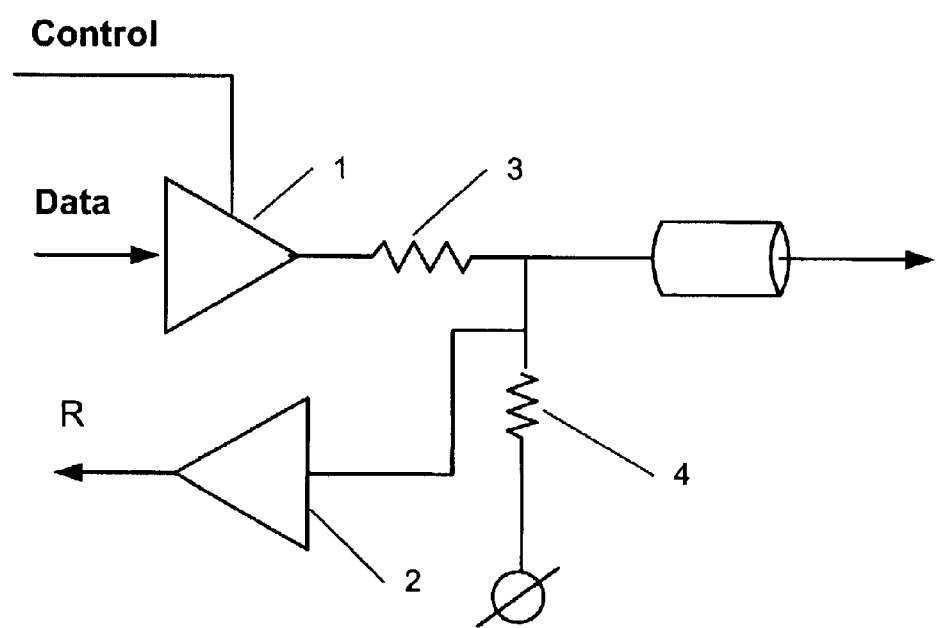
FIG. 1a illustrates a prior art transceiver with terminating resistors.
Figure 2A:
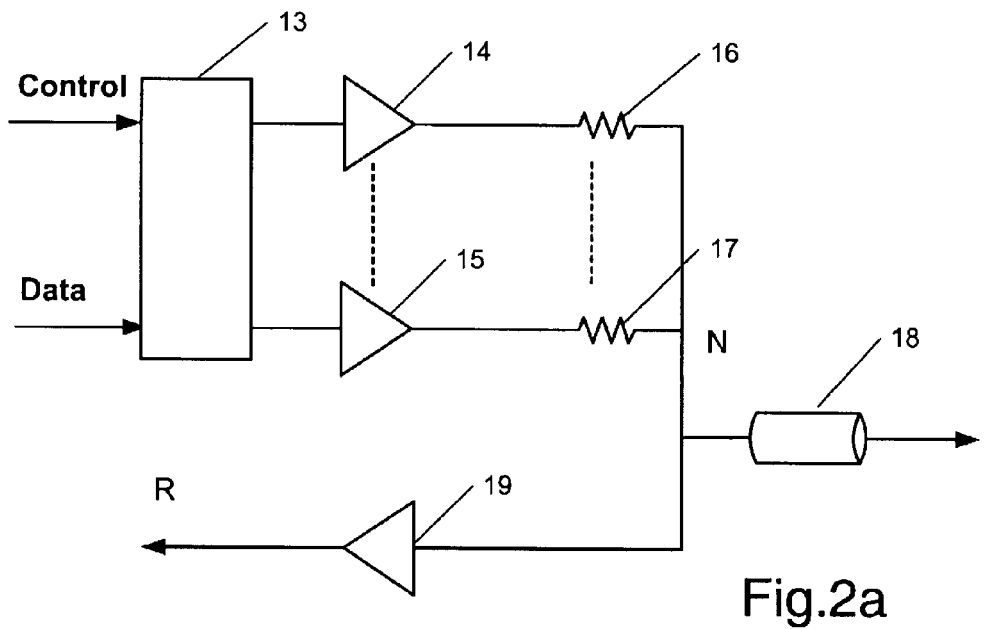
FIG. 2a is a schematic diagram of a transceiver with differential termination according to the present invention.

In FIG. 2a a schematic diagram of a transceiver according to the present invention is shown comprising a driving circuit consisting of a plurality of drivers 14 to 15 providing a DATA signal to be transmitted, and comprising a respective set of terminating resistors 16 to 17. In this example, the DATA signal is a multiple bit signal providing a multilevel data transmission down a communication line.

Figure 2B:
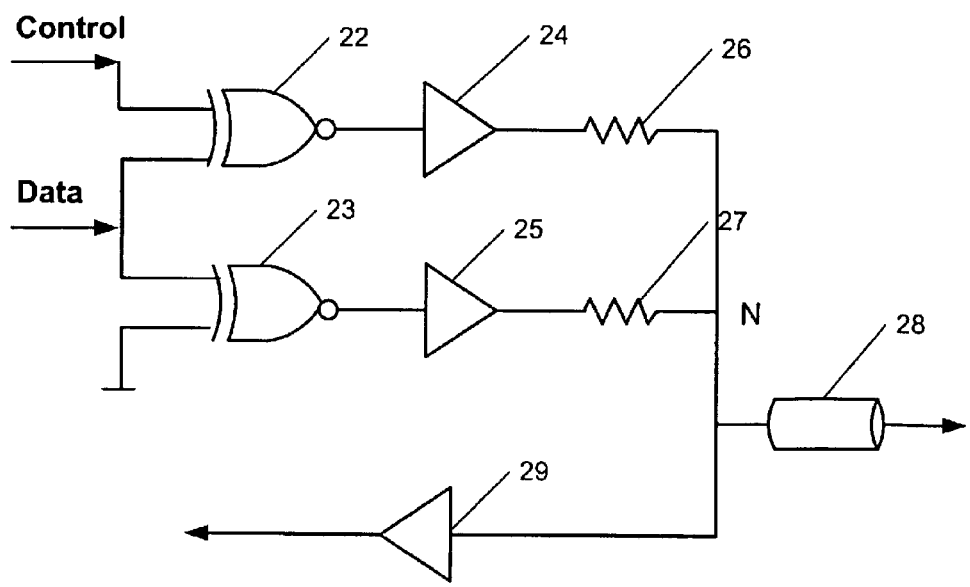
FIG. 2b is another example embodiment of a transceiver with differential termination according to the present invention.

The resistors are connected to the transmission line 18. The drivers may be implemented with an Exclusive OR (XOR) function as shown by reference numbers 22 and 23 in FIG. 2b, so that a CONTROL line can cause one of the drivers 24, 25 to produce an inverse signal as a function of whether it is high or low. It shall be also appreciated that other suitable logical operands may be used in this case.

Each driver has its own terminating resistor, which may be for example 100 Ohms (assuming 50 Ohms transmission line) depending on the impedance of the bus 18 into which it is driving.

The receiver 19 produces a signal R, which represents the signal received by the transceiver. The transmission line 18 may be a cable, a track on a circuit board or any other connection between two elements of an electronic circuit.

The system in FIG. 2a operates as follows. When the control line has a low level, the input data are buffered to the outputs of both drivers 14, 15. The transmission line 18 is driven via series terminating resistors 16, 17. When the control line is in a high level, the output of one of the drivers is inverse to another. So, the both resistors 16, 17 act as a parallel termination (connected to the median voltage in case of equal resistances) for the receiver.

Figure 3:
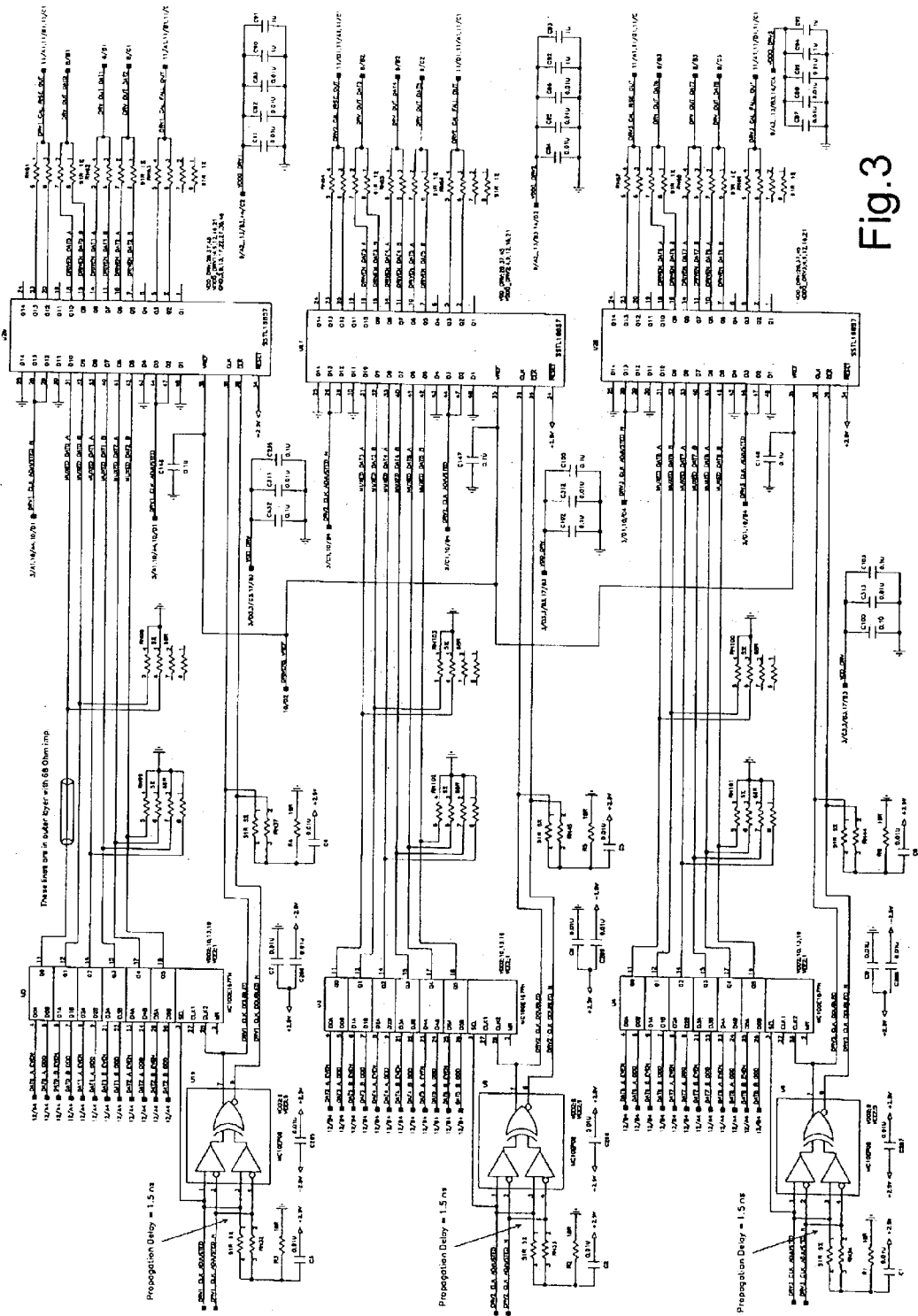
FIG. 3 is a part of an actual circuit diagram of an automatic testing equipment in which transmitters with differential termination are used according to the present invention.

One of the actual detailed circuit diagrams implementing the present invention is shown in FIG. 3.

The circuit shown in FIG. 3 provides accurate timing for bidirectional data buses used in Automatic Testing Equipment for testing DDR SDRAM memories. The circuit comprises tree channels for high speed data transmission and respectively, three transmitters implemeneted as registers, in this case, registers SSTL16857 supplied by Philips Inc., and three sets of series terminating resistors RN61-RN63, RN64-RN66, and RN67-RN69, in this case, resistor networks from Burns Inc or Philips. Further, each channel comprises a multiplexer implemented, e.g. in MC100E167FN by Motorola, for conversion of SDR (single data rate) type signals into DDR (double data rate) type signals, a frequency doubler circuit MC10EP08 also, by Motorola, a set of resistors, e.g. RN99, RN98 for parallel termination, and by-pass capacitors, e.g., VDDQ.

Figure 4:
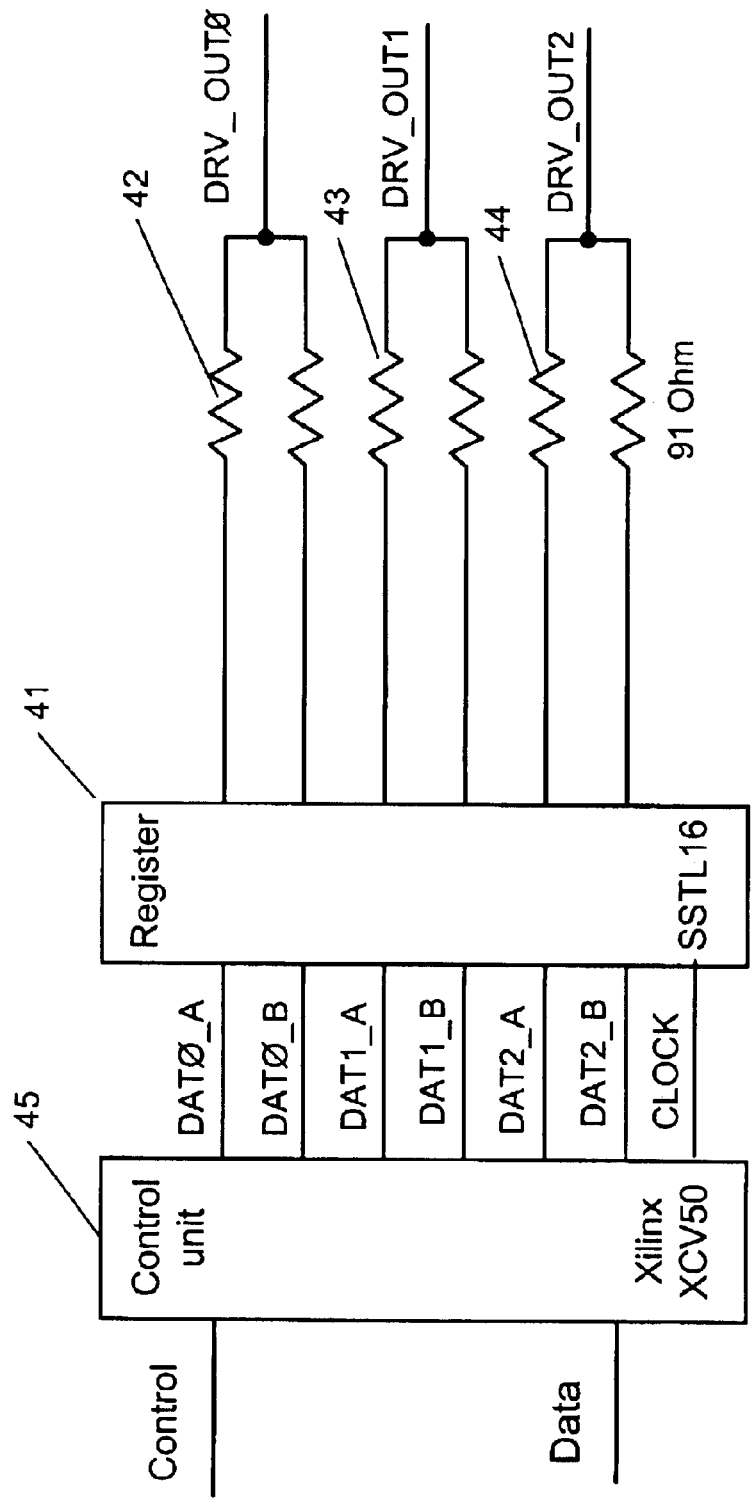
FIG. 4 is an enlarged view of a transmitter with differential termination from the circuit diagram of FIG. 3.

To simplify the explanation, in FIG. 4, one such register 41 is shown in detail with a set of series terminating resistors 42, 43 and 44 and a control unit 45, which may be implemented as a part of an FPGA Xilinx XCV50 (not shown in the figure), according to the present example embodiment. It shall be also mentioned that, according to the present example, all the resistors are the same. Also, for the present example, each terminating resistor shall have the value of 91

Ohm to provide the output and terminating impedance of 50 Ohm, taking into account the output impedance of the register.

The operation of the circuit will now be described with reference to FIG. 5, in which timing diagrams are illustrated for one of the three channels of the circuit shown in FIG. 4.

For each output signal DRV-OUT, two input signals DATØ_A and DATØ_B, are provided from control unit 45.

Figure 5:
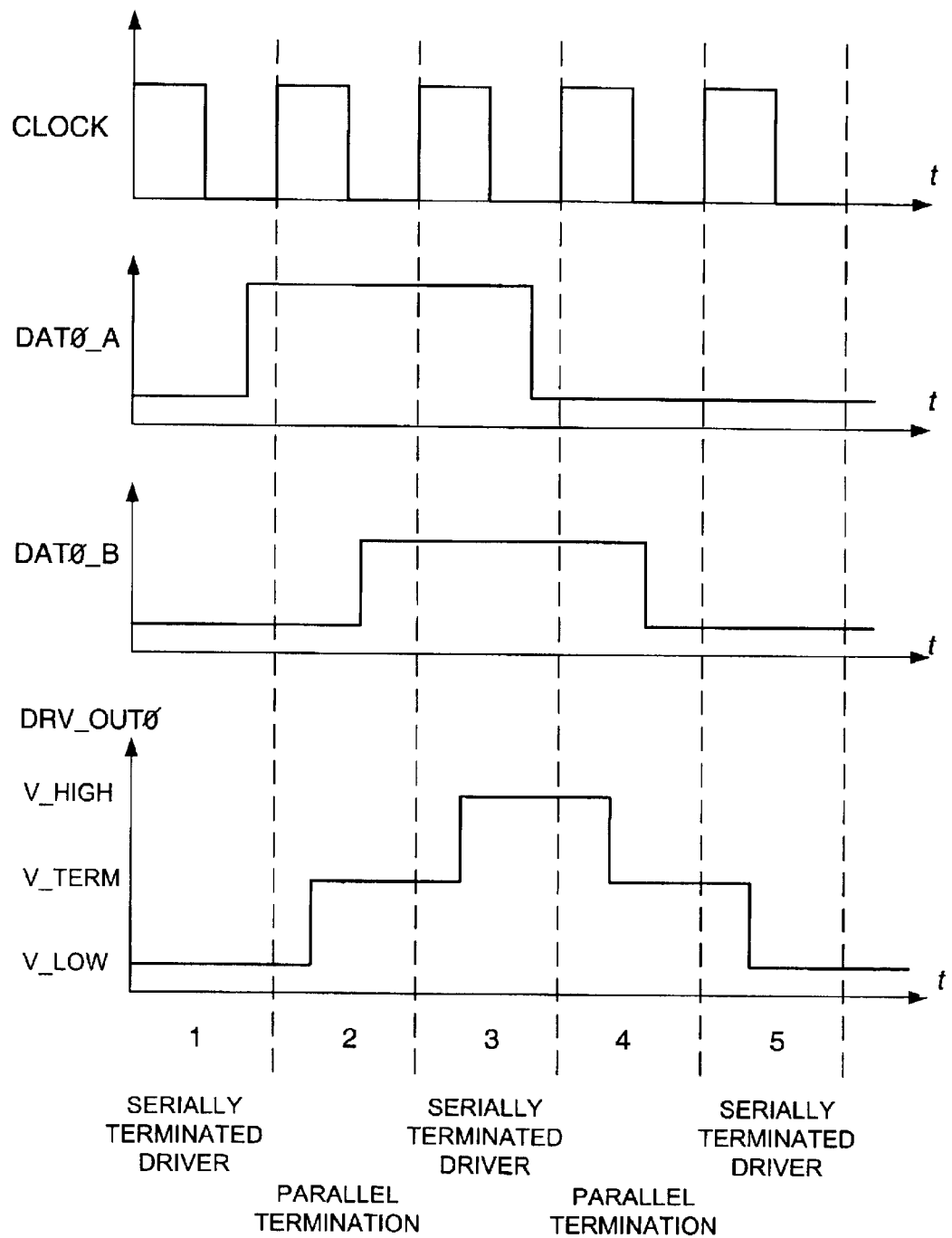
FIG. 5 is a timing diagram illustrating operation of the transmitter of FIG. 4.

In phase 1 of the timing digram of FIG. 5, and in each subsequent odd phase, each driver of the register 41 functions as a seraily terminated driver.

In phase 2 of the timing digram, the signal DAT_A becomes a logical <<1>>, while the signal DAT_B becomes a logical <<0>>. Thus, the signal at the output of series terminating resistors, say resistors 42, will amount to $$\frac{V_H + V_L}{2}$$

that provides a terminating voltage for the bus. In this case, the driver operates as a parallel terminator, i.e. performs a terminating function itself.

In phase 3, both input signals supplies logical <<1>>, so that the driver drives a logical <<1>> to the load.

In phase 4 of the timing digram, the driver operates as a parallel terminator, i.e. performs a terminating function itself, the same as described above with reference to phase 2.

In phase 5, both input signals bears logical <<0>>, so that the driver drives a logical <<0>> to the load.

Thus, the above description explains how to obtain all the states required for operation of the bidirectional bus for supplying data in case of DDR SDRAM.

It shall be also appreciated that various modifications can be made to the present invention without departing from the scope of the claims.

What is claimed is:

1. A transmitting circuit comprising
   a plurality of drivers each having series terminating resistor; wherein the series terminating resistors for all drivers are joined in a common point;
   a control unit provided by a data signal and a control signal, for driving the plurality of drivers; the control unit capable of operating the drivers in two modes, wherein:
   in the first mode, a control unit supplies drivers with a signal which is a function of input data, to provide the transmitter drives a communication line with an output impedance equal to the parallel effect of all the terminating resistors;
   in the second mode, the control unit generates a signal to make the plurality of drivers with respective series terminating resistors acting as a parallel termination circuit, while no actual data is transmitted in this mode.

2. The transmitter according to claim 1, wherein the plurality of drivers comprises two drivers.

3. The transmitter according to claim 1, wherein in the first mode, all the drivers drives the same signal.

4. The transmitter according to claim 1, wherein in the second mode, one driver or a group of drivers drives one logic level signal, while the other drivers drives the inverse to this signal.

5. The transmitter according to claim 1, wherein the series terminating resistors are joined in a common point connected via a transmission line to a receiver.

6. The transmitter according to claim 5, wherein the receiver is connected to the common point via a resistor.

7. A method of high speed data transmission, comprising the steps of:
   (a) providing a plurality of drivers each having series terminating resistor, wherein the resistors are connected at a common point;
   (b) providing a data signal;
   (c) providing a control signal for operating the drivers in two modes, wherein:
   (d) in the first mode, a control unit supplies drivers with a signal which is a function of input data, to provide the plurality of drivers drives a communication line with an output impedance equal to the parallel effect of all the terminating resistors;
   (e) in the second mode, the control unit generates a signal to make the plurality of drivers with respective series terminating resistors acting as a parallel termination circuit, while no actual data is transmitted in this mode;
   (f) repeating steps (d) and (e).

8. The method according to claim 7, wherein the plurality of drivers comprises two drivers.

9. The method according to claim 7, wherein in the second mode, one driver or a group of drivers drives one logic level signal, while the other drivers drives the inverse to this signal.

10. The method according to claim 7, wherein the series terminating resistors are joined in a common point connected to a transmission line.

11. The method according to claim 7, wherein the data signal is a multiple bit signal.

12. The method according to claim 7, wherein the data signal and control signal are provided by a control unit.

13. A transceiver comprising:
    a transmitting circuit comprising a plurality of drivers each having series terminating resistor; wherein the series terminating resistors for all drivers are joined in a common point;
    a receiving circuit comprising at least one receiver; and
    a control unit provided by a data signal and a control signal, the control unit capable of driving the plurality of drivers in two modes, wherein
    in the first mode, the control unit supplies drivers with a signal which is a function of input data, to provide the transmitter drives a communication line with an output impedance equal to the parallel effect of all the terminating resistors;
    in the second mode, the control unit generates a signal to make the plurality of drivers with respective series terminating resistors acting as a parallel termination circuit, while no actual data is transmitted in this mode.

14. The transceiver according to claim 13, wherein the plurality of drivers comprises two drivers.

15. The transceiver according to claim 13, wherein the series terminating resistors are joined in a common point connected to a transmission line and the receiver.

16. The transceiver according to claim 13, wherein in the second mode, one driver or a group of drivers drives one logic level signal, while the other drivers drives the inverse to this signal.

17. The transceiver according to claim 13, wherein the receiver is connected to the common point via a resistor.

* * * * *

UNITED STATES PATENT AND TRADEMARK OFFICE
CERTIFICATE OF CORRECTION

| | | |
|---|---|---|
| PATENT NO. | : 6,788,102 B2 | Page 1 of 1 |
| APPLICATION NO. | : 10/425638 | |
| DATED | : September 7, 2004 | |
| INVENTOR(S) | : Vasily Grigorievich Atyunin et al. | |

It is certified that error appears in the above-identified patent and that said Letters Patent is hereby corrected as shown below:

On the Title Pg, Item (56), References cited: U.S. Patent No. 5,528,268 should be 5,528,168.

Signed and Sealed this

Thirteenth Day of September, 2011

David J. Kappos
*Director of the United States Patent and Trademark Office*